United States Patent [19]

Ooba et al.

[11] 4,048,253
[45] Sept. 13, 1977

[54] ADHESIVE COATINGS FROM ETHER-TYPE POLYESTER, URETHANE ELASTOMER, AND POLYISOCYANATE

[75] Inventors: Seiichi Ooba, Odawara; Shinichi Hirayama, Fukuyama, both of Japan

[73] Assignee: Fuji Photo Film Co., Ltd., Minami-ashigara, Japan

[21] Appl. No.: 612,131

[22] Filed: Sept. 10, 1975

Related U.S. Application Data

[62] Division of Ser. No. 428,998, Dec. 27, 1973, abandoned.

[30] Foreign Application Priority Data

Dec. 27, 1972   Japan .................... 48-2208

[51] Int. Cl.$^2$ .................... C08G 18/42; C08L 75/00
[52] U.S. Cl. .................... 260/858; 260/40 TN; 260/75 T; 260/75 NP; 428/424
[58] Field of Search .................... 260/858

[56] References Cited

U.S. PATENT DOCUMENTS

| | | | |
|---|---|---|---|
| 2,880,192 | 3/1959 | Coffey et al. | 260/858 |
| 2,888,432 | 5/1959 | Fauser | 260/858 |
| 3,170,833 | 2/1965 | Noyes | 260/858 |
| 3,190,770 | 6/1965 | Lavin et al. | 260/858 |
| 3,192,287 | 6/1965 | Pelzek et al. | 260/858 |
| 3,686,146 | 8/1972 | Goto | 260/858 |
| 3,781,381 | 12/1973 | Koleske et al. | 260/858 |
| 3,910,846 | 10/1975 | Azar et al. | 260/29.2 E |

FOREIGN PATENT DOCUMENTS 43-20313  8/1968  Japan

Primary Examiner—Murray Tillman
Assistant Examiner—Arthur H. Koeckert
Attorney, Agent, or Firm—Sughrue, Rothwell, Mion, Zinn and Macpeak

[57] ABSTRACT

The present invention provides adhesive compositions of improved adhesion which comprise (a) an ether-type polyester obtained by the heat treatment of a polyethylene-terephthalate with at least one glycol having at least 3 carbon atoms to interchange the ethylene glycol components in the polyethylene-terephthalate, and (b) a linear thermoplastic high molecular weight urethane elastomer. Embodiments include an adhesive composition, comprising component (a) and component (b) plus (c) a polyisocyanate and an adhesive coating composition comprising an ether-type polyester obtained by the heat treatment of a polyethylene terephthalate with at least one glycol having at least 3 carbon atoms to interchange the ethylene glycol components in the polyethylene terephthalate, a polyisocyanate and a pigment.

10 Claims, No Drawings

ADHESIVE COATINGS FROM ETHER-TYPE POLYESTER, URETHANE ELASTOMER, AND POLYISOCYANATE

This is a Division of application Ser. No. 428,998, filed Dec. 27, 1973 and now abandoned.

BACKGROUND OF THE INVENTION

1. Field of the Invention

The present invention relates to adhesive compositions having improved characteristics, and in greater particularity, to an adhesive coating composition having intimate adhesion, good strength, elasticity and excellent abrasion resistance.

2. Description of the Prior Art

It is known to improve the cross-linking characteristics of a thermoplastic polyester, for example, polyethylene terephthalate, by adding thereto a trifunctional isocyanate, and to use the same as a binder for paints, laminates, etc. By virtue of the fact, however, that the polyesters have a high crystallizability, a hard adhesive coating is formed, and thus the uses of conventional polyester adhesive compositions are limited.

Also, in conducting coating, the surface of a material to be coated must be processed sufficiently so as to make the adhesion between the material to be coated and the coating composition an perfect as possible. For example, upon coating a metallic substance with a coating material, complicated pretreatments such as sanding for removing rust and washing with a solvent are required. Such procedures involve a considerable amount of labor and cost, in the fields of manufacturing and repairing ships, cars and the like. Therefore, it is desirable that they be eliminated or be minimized as much as possible.

SUMMARY OF THE INVENTION

An object of the present invention is to provide adhesive compositions whicn have an improved and excellent adhesion and which may be used in a great number of varied applications.

It is, also, an object of the present invention to provide an adhesive which can be used to bond a variety of materials and also an adhesive coating composition having good adhesion, strength, elasticity and abrasion resistance and being usable substantially without any surface-processing of a substance to be coated.

The object of the present invention can be attained by incorpoating into a specific polyethylene terephthalate a linear thermoplastic high molcular weight urethane elastomer.

Accordingly, the present invention provides adhesive compositions having improved and excellent properties, such as high adhesion, which comprise: (a) an ether-type polyester obtained by the heat treatment of a polyethylene terephthalate with one or more glycols other than ethylene glycol to substitute for the ethylene glycol components in the polyethylene terephthalate the used glycols; and (b) a linear thermoplastic high molecular weight urethane elastomer. In a second embodiment, this invention provides an adhesive composition comprising the above described component (a) and component (b) with (c) a polyisocyanate. In a further embodiment the present invention comprises an adhesive coating composition containing an ether-type polyester (a) and (c) a polyisocyanate along with (d) a pigment.

DETAILED DESCRIPTION OF THE INVENTION

In general, as adhesives which can be applied not only to flexible materials such as fabrics, rubbers, polyolefin, etc. but also to any polar or non-polar substances to be affixed there are used, for example, linear thermoplastic high molecular weight urethane elastomers (hereunder merely referred to as urethane elastomers). According to research conducted by the inventors, it was found that by the addition of 10–40% by weight of one or more ether-type polyesters to one or more urethane elastomers, the adhesion thereof at normal temperatures is markedly increased.

In the present specification, the ether-type polyesters are ones which are described in detail in Japanese Pat. Publication No. 20313/68 or, more precisely, those which are obtained by heating a polyethylene terephthalate together with one or more glycols other than ethylene glycol to substitute the ethylene glycol components in the polyethylene terephthalate by the glycols used. For example, about 30–100% of the ethylene glycol components in the polyethylene terephthalate are substituted by polyethylene glycols, whereby a non-crystalline product is obtained which has excellent adhesion to various kind of organic substances, polyolefins, rubbers, etc.

The polyethylene terephthalate used in this invention is a polymer which is formed of ethylene glycol and a terephthalic acid. Many methods for the formation of polyethylene terephthalate are known. Generally, bis (2-hydroxyethyl) terephthalate is formed and then this is polycondensed.

The intermediate bis (2-hydroxyethyl) terephthalate is formed from dimethyl terephthalate or terephthalic acid. In the former case, 2 to 4 mols of ethylene glycol are catalytically reacted per 1 mol of dimethyl terephthalate. Under normal pressure the system is heated gradually to 160° ~ 220° C. the reaction is finished in 4 to 6 hours and the methanol formed is removed. This process is described schematically below

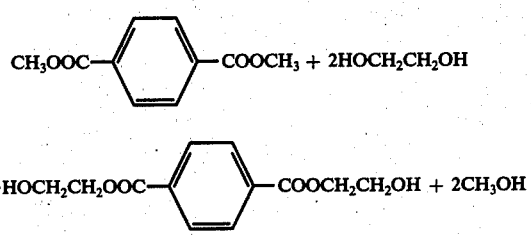

In the latter case, the main materials are high purity terephthalic acid and ethylene glycol, and as a catalyst alkali metal salts of terephthalic acid, titanium oxide, simple metal substances and the like are used. This process is described schematically below

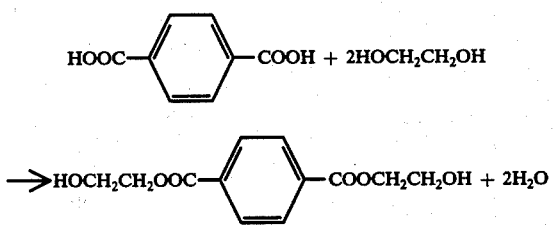

The thus obtained bis (2-hydroxyethyl) terephthalate is heated under reduced pressure and poly condensed, usually, at 260° to 300° C, under a pressure less than 1 mmHg. Ethylene glycol that forms is recovered.

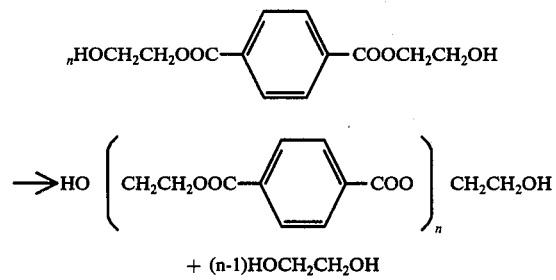

After the condensation reaction is completed the polymer is collected.

Details of such procedures are described in "Chemistry of Terylene" by J. R. Whinfield, (Nature, Vol. 158, pages 930 ~ 931 (1946); "Polyethylene terephthalate and Its Early Development" by D. V. N. Hardy (*Journal of Society of Chemical Industry*, Vol. 67, pages 426 ~ 432 (1948)) British Pat. Nos. 578,079; 610,183; 627,270; 630,992; 590,417; 682,866; 727,729; 777,628; 727,790; and U.S. Pat. Nos. 2,465,314; 2,465,319; 2,518,283; 2,578,660; 2,597,643; 2,643,989; 2,647,885; 2,650,213; 2,719,835 and the like. The resulting polymers have a molcular weight of from 5,000 to 100,000, preferably from 10,000 to 50,000.

The term "glycols" in referring to glycols other than ethylene glycol as is used herein denotes dihydric alcohols. The glycols other than ethylene glycol used in the present invention includes basically glycols having 3 or more carbon atoms such as the polymethylene glycols represented by the formula $HO(CH_2)_n OH$ wherein $n$ represents an integer from 3 to 20, e.g., trimethyleneglycol, 1,4-butanediol, 1,5-pentanediol, 1,6-hexanediol, 1,7-pentanediol, 1,8-octanediol, 1,9-nonanediol, 1,10-decanediol and the like; the polyethylene glycols represented by the formula $HO(CH_2CH_2O)_nH$ wherein $n$ represents an integer of from 2 to 100, e.g., diethylene glycol, triethylene glycol and the like; and the alkylene glycols such as propylene glycol, butylene glycol, neopentyl glycol, hexylene glycol, octylene glycol, cyclohexane-1,4-dimethanol and the like. Also, glycols having an aromatic group bridging two hydroxy groups can be used. Examples of such glycols are as follows:

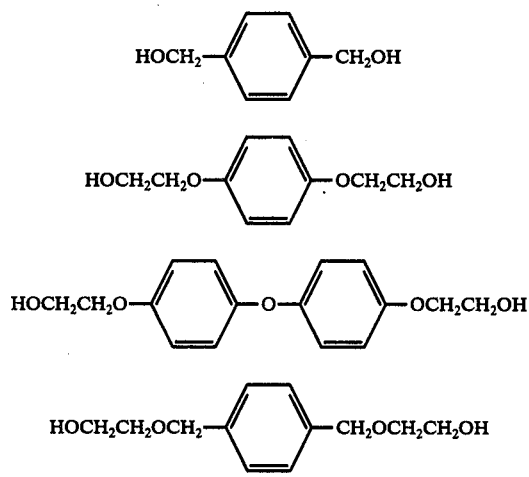

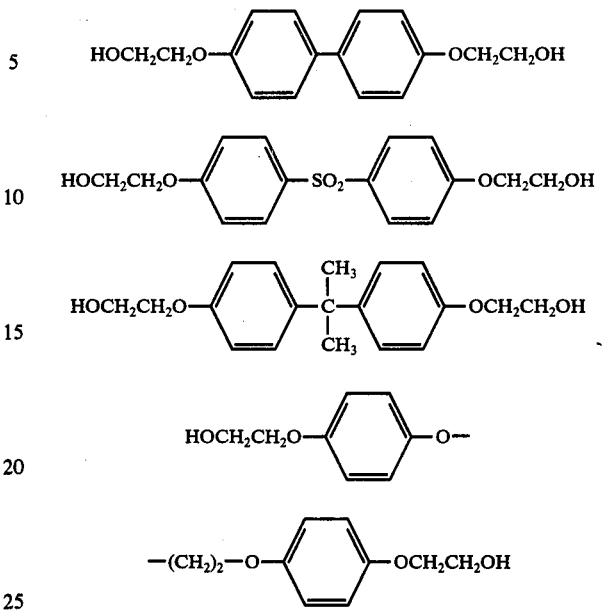

PREPARATION OF THE ETHER-TYPE POLYESTER

The ether-type polyesters used in the present invention can be prepared by heating the above polyethylene terephthalate together with at least one of the glycols described above, thereby substituting a part or all of ethylene glycol components (30 mol % to 100 mol %) in the polyethylene terephthalate molecule with the glycols by a transesterification reaction to produce a polyglycol terephthalate "copolymer." In contrast to the high molecular weight and the high melting point due to high crystallinity of the starting polyethylene terephthalate, the copolymer thus obtained has a relatively low molecular weight and can be a slightly crystalline or highly crystalline polymer in view of the fact that the regularity of the molecule is lowered by introducing heterogeneous glycol components into the copolymer.

In a specific embodiment for the preparation, of the ether type polyester used in this invention, 100 parts by weight of polyethylene terephthalate are added to 10 to 200 parts by weight of the glycol as recited above, and the mixture is reacted by gradually heating the mixture whereby polyethylene terephthalate is dissolved or dispersed in the glycol near the melting point of the terephthalate. The reaction temperature is generally from about 190° C to about 260° C. In this reaction, a catalyst for the transesterification as is commonly employed in the preparation of polyethylene terephthalate, for example, an alkali metal, an alkaline earth metal or a derivative thereof can be added to the reaction sytem to promote the reaction. The reaction is usually completed in a period of from about 2 to about 20 hours, generally from 6 to 10 hours. The ethylene glycol formed during the reaction is removed from the reaction system by distillation. After completion of the reaction, the reaction system is maintained under reduced pressure or in vacuo in order to ensure the complete removal of ethylene glycol and unreacted starting glycol, and the desired polymer as a residue is collected. The reaction per se is typically at atmospheric pressure but if desired sub- or superatmospheric pressure can be used.

On the other hand, the term "urethane elastomer" as used herein to describe the second component of the composition according to the present invention is used to cover generally those compounds as they are usually defined in the plastics art.

More particularly, it includes compounds having a urethane bond, which are obtained as described hereinafter by the addition reaction of (1) a polyisocyanate, preferably a diisocyanate, and (2) a polyol, a polyamine or an aminoalcohol, preferably a diol.

The properties of these urethane elastomers can be varied easily and to a large extent depending on the kinds of and the relative amount between the reactant (1) and (2).

In the present invention, while the properties of the urethane elastomer are not critical, those having a molecular weight of about 200 to 20,000, preferably 500 to 5,000, are used preferably; and linear thermoplastic urethane elastomers are also preferred.

The reactants used as starting materials for the urethane elastomer are described in detail as follows:

Suitable polyisocyanates, Reactant (1), include the following polyisocyanates, e.g., diisocyanates such as diphenylmethane-4,4'-diisocyanate, diphenyldimethylmethane-4,4'-diisocyanate, phenylene-1,4-diisocyanate, 2,2',6,6'-tetramethyldiphenylmethane-4,4'-diisocyanate, diphenyl-4,4'-diisocyanate, diphenylether-4,4'-diisocyanate or the alkyl-, the alkoxy- or the halogen-substituted derivatives thereof, toluylene-2,4- or -2,6-diisocyanate or a mixture thereof, 2,4-diisopropylphenylene-1,3-diisocyanate 3,3'-bitolylene-4,4'-diisocyanate, 3,3'-dimethylphenylmethane-diisocyanate, 1-methyl-3,5-phenylenediisocyanate, 1,5-naphthylene-diisocyanate, 1,1'-dinaphthyl-2,2'-diisocyanate, biphenyl-2,4-diisocyanate, 3,3'-dimethylbiphenyl-4,4'-diisocyanate, 3,3'-dimethoxybiphenyl-4,4'-diisocyanate, the dimer of tolylenediisocyanate, 4,4-diisocyanatephenylpropane, m-phenylenediisocyanate, m-xylylenediisocyanate, p-xylylenediisocyanate and α,αλ,α',α'-tetramethyl-p-xylylenediisocyanate. In addition the alkyl- or halogen-substituted products of above-mentioned diisocyanates, for example, 2,5-dichloro-p-xylylenediisocyanate or tetrachloro-p-phenylenediisocyanate, the dimer of toluylene-2,4-diisocyanate or bis-(3-methyl-4-isocyanatephenyl)-urea, 2-nitrodiphenyl-4,4'-diisocyanate, diethyldiphenyldiisocyanate, tolylenedisulfonylisocyanate, hexahydroxylylenediisocyanate, dimethylnaphthaleneω,ω'-diisocyanate, 1,4-bisisocyanatemethyldurene, diphenylmethanedisulfonyldiisocyanate, terephthalydiisocyanate, adipinyldiisocyanate, hexane-1,6-diisocyanate, cyclohexane-1,4-diisocyanate, dicyclohexylmethane-4,4-diisocyanate, 4-t-butyl-3,5-diisocyanate methylbenzoate, 4-chloro-3,5-diisocyanate ethylbenzoate, 1-cyanate-3-isocyanatemethyl-3,5,5'-trimethylcyclohexane or 2,2',4-trimethylhexane-1,6-diisocyanate, ω,ω'-di(isocyanateethyl)benzene or 1,2,3,4,5,6-hexahydrodiphenylmethane-4,4'-diisocyanate, butanediisocyanate, 3-butoxyhexanediisocyanate, nonanediisocyanate, decanediisocyanate, 1,4-butyleneglycoldipropylether-ω,ω'-diisocyanate, thiodihexyldiisocyanate, 3-isocyanatemethyl-3,5,5'-trimethylcyclohexyldiisocyanate, hexamethylenedithioisocyanate and the like can be used. Suitable polyisocyanates which can be used are those such as 4,4',4"-triphenylmethane-triisocyanate, toluene-2,4,6-triisocyanate, polymethylpolyphenyleneisocyanate, triphenylmethanetriisocyanate, dimethyldiphenylmethanetetraisocyanate and the like; isopropylidenedicyclohexyl-4,4'-diisocyanate, and the condensation products of above-described polyol (including the diol, triol and hexitol etc.) or alkyleneoxide derivative (ether) of the polyol with a diisocyanate (preferably an aromatic diisocyanate) which may form polyisocyanate (containing two free NCO groups). These polyisocyanate and the manufacture thereof are described in British Pat. Nos. 982,222 and 840,500 and U.S. Pat. Nos. 3,261,655 and 3,219,598.

Especially advantageously, above all, diphenylmethane4,4'-diisocyanate, diphenylether-4,4'-diisocyanate, p-phenyldiisocyanate and toluylenediisocyanate isomer, and cis/cis- and/or cis/trans- and/or trans/trans-isomer (if necessary, in a defined ratio) of hexane-1,6-diisocyanate, naphthalene-1,5-diisocyanate, m-xylylenediisocyanate and dicyclohexylmethane-4,4'-diisocyanate, and lysinediisocyanate can be used. (These isocyanates are described in the literature, for example in Georg Thieme *Methoden der Organischen Chemie* (Houben Weyl) VIII, *Oxygen Compounds III* (1952) George Thieme, Stuttgart, *Polyurethane*, Matsudaira et al 1968, Maki Publishing Co. Ltd., Suitable examples of polyols which can be used as Reactant (2) include low molecular weight polyols such as ethyleneglycol, diethyleneglycol, triethyleneglycol, dipropyleneglycol, 1,3-butyleneglycol, 2-ethyl-1,3-hexanediol, 2,2,4-trimethyl-1,3-pentanediol, N,N'-bis-(γ-hydroxyethyl)-piperazine, hydroquinone-bis-(β-hydroxyethylether), polyoxetane, cyclohexanediol, xylylenediol, di-(β-hydroxyethoxy)benzene, glycerine, 2-hydroxyethylmercaptan, diglycerin, neopentylglycol, trimethylolpropane, triethylolpropane, pentaerythritol, dipentaerythritol, sorbitan, sorbitol, butanediol, butanetriol, 2-butene-1,4-diol, 2-n-butyl-2-ethylpropanediol, 2-butene-1,4-diol, 3-chloro-1,2-propanediol, 1,4-cyclohexanedimethanol, 3-cyclohexane1,1-dimethanol, decalindiol, 2,3-dibromo-2-butene-1,4-diol, 2,2-diethyl-1,3-propanediol, 2,5-dimethyl-2,5-hexanediol, 2,2-dimethyl-1,3-propanediol, decanediol, 2-ethyl-1,3-hexanediol, 2-ethyl-2-(hydroxymethyl)-1,3-propanediol, 2-ethyl-2-methyl-1,3-propanediol, heptanediol, hexanediol, 3-hexane-2,5-diol, hydroxybenzylalcohol, 2-methyl-1,4-butanediol, 2-methyl-2,4-pentanediol, nonanediol, octynediol, pentanediol, 1-phenyl-1,2-ethanediol, propanediol, 2,2,4,4-tetramethyl-1,3-cyclobutanediol, 1,1-methylmethylenedi2-naphthaol, 2,2-bis(4-hydroxyphenyl)butane, 1,1-bis(4-hydroxyphenyl)cyclohexane, bis(hydroxyphenyl)methane, catechol, 3,4-dihydroxydihydrocinnamic acid, hydroquinone, hydroxybenzylalcohol, methylhydroquinone, phloroglucinol, resorcinol, glucose, α-(1-aminoethyl)-p-hydroxybenzylalcohol, N,N-bis-(2-hydroxyethyl)-piperazine, polyoxypropylene(2,2)-2,2-bis(4-hydroxyphenyl)propane, 2,2-bis(hydroxymethyl)-2,2,2-nitrilotriethanol, 2,2-bis(hydroxymethyl)propionic acid, 1,3bis(hydroxymethyl)urea, 1,2-bis(4-pyridyl)1,2-ethanediol, N-ethyldiethanolamine, 3-piperizino-1,2-propanediol, 2-(2-pyridyl)1,3-propanediol, α-(1-aminoethyl)-p-hydroxybenzylalcohol, 3-amino-4-hydroxyphenylsulfone, piperazine, methylpiperazine, 2,5-dimethylpiperazine, dimethylethylenediamine, dimethylbutylenediamine, dimethylhexamethylenediamine, dimethylxylenediamine, and the like.

Further polyesterdiols having a Terminal hydroxy group are included as Reactant (2). These polyesterdiols can be synthesized from, for example, dibasic dicarboxylic acids (for example, those having 3 to 20 carbon atoms, such as succinic, glutaric, adipic, pimelic, azelaic, sebacic, linolic, isophthalic, terephthalic and suberic acid) and the diols as described above (for example, ethyleneglycol, 1,2-propyleneglycol, 1,3-propanediol, 1,4-butanediol, 1,2-butanediol, 1,6-hexanediol, cyclohexanedimethanol, diethyleneglycol, triethyleneglycol and neopentylglycol). Mixtures of the glycol or dibasic dicarboxylic acid can be used. There are used in general the polyethyleneadipatediol prepared from adipic acid and ethyleneglycol, the polyesterdiol prepared from adipic acid and diethyleneglycol, the polyesterdiol prepared from adipic acid and 1,4-butyleneglycol, the polyesterdiol prepared from adipic acid and neopentylglycol, the polyesterdiol prepared from linoleic acid and hexanediol, the polyesterdiol from adipic acid and ethyleneglycol/1,4-butyleneglycol (mixture) and the like. In general, these polyesterdiols used are in the form of a liquid, wax or crystalline form having a mean molecular weight of about 500 – 2,000.

The polyetherdiols are diols having terminal hydroxy group, such as the homopolymers or copolymers of alkyleneoxides. Typical examples are those having an ether bond in the main chain, for example, such as polyethyleneoxide, polypropyleneoxide, polypropyleneoxide, polybutyleneoxide, ethyleneoxide-propyleneoxide copolymer, polytetrahydrofuran and the like; those having preferably a mean molecular weight of about 400 – 2,000 are commercially available.

Among of these Reactants (2), above all, the alkylenediols or the polyesterdiols and the polyetherdiols are used often for the synthesis of urethane elastomer.

The synthesis of the urethane elastomer from Reactants (1) and (2) as described above is well known.

Representative processes for preparing urethane elastomers are as follows:
1. the reaction of a diisocyanate(s) and a polymer diol(s) plus optionally a diol by heating
2. the reaction of a diisocyanate(s) and a polymer diol(s) with heating and subsequently the reaction under heating with the intermediate reaction product formed with a diol(s) Suitable polymer diols which can be used and their molecular weight ranges are set forth below

| Polymer Diols | Molecular Weight |
|---|---|
| $HOCH_2CH{\displaystyle\genfrac{}{}{0pt}{}{R_1}{|}}\left[OCH_2CH{\displaystyle\genfrac{}{}{0pt}{}{R_1}{|}}\right]_n OH$ (polyether type) | 400 ~ 2000 |
| $HO(CH_2)_4\text{–}[O(CH_2)_4]_n\text{–}OH$ (polytetrahydrofuran type) | 500 ~ 2000 |
| $HO\text{–}R_2\text{–}[OCOR_3COOR_2]_n\text{–}OH$ (polyester type) | 1000 ~ 2500 |
| $HO(CH_2)_5COOR_2\text{–}[OCO(CH_2)_5]_n\text{–}OH$ (lactone polymer type) | 600 ~ 2000 | wherein in the above $R_1$ is H or $CH_3$, $R_2$ is a diol residue $R_3$ is a dicarboxylic acid residue and $n$ is 5 to 100, preferably 10 to 50.

The end groups of urethane elastomer produced vary depending on the ratio of the isocyanate groups to the hydroxy groups in accordance with the following:

| NCO/OH Group Ratio | Urethane Elastomer Terminal Group |
|---|---|
| NCO/OH > 1 ⟶ | OCN~NCO |
| NCO/OH = 1 ⟶ | OCN~OH |
| NCO/OH < 1 ⟶ | HO~OH |

Suitable commercially available examples of urethane elastomers are as follows: Trade Name of Urethane Elastomer Desmodur 15, 44, T65, CD, 44V, VL, H, E1160, E21,
Desmophen 2000, 2001, 2020, 2200 W
Desmopan 194, 295, 385, 485, D90, 1513, 1514, 1533, 1613
Desmocoll 12, 22, 130, 176, 400, 405, 420
Desmodur R, RF
(produced by Sumitomo-Bayer Co. Japan);
Estane 5701, 5707, 5710, 5715
5702 F1, 5702 F2, 5703 F1, 5703 F2, 5707 F1,
5707 F1, 5710 F1, 5714 F1, 58013, 58029
58054, 58091, 58092, 58105, 58105, 58109,
58110, 58111, 58113, 58300, 58305, 58306,
58401, 58409, 58533, 58600, 58610, 58630,
(produced by B. F. Goodrich Chemical Co.); Pandex (produced by Dai Nippon Ink Co.) Parapren (produced by Nippon Polyurethane Co.) Iron Rubber (produced by Nippon Oil Seal Co.) Elastran (produced Nippon Elaston Co.)
Vull Kollan (produced by Bayer)
Chemigum SL
Neothane (produced by Goodyear Tire Co.)
Adiprene (produced by Du Pont Co.) such as
Adiprene LD 167, B, C, L,LD-167, LD-213
Vulcaprene A (produced by I. C. I. Ltd.) etc. For example, the polyurethanes are described in the following:
1. Hiramatsu et al: *Polyurethane* p. 149 – 180, 1968, Maki-Shoten, Tokyo.
2. C. A. Waugman *Modern Plastics,* 39, Oct., 146 (1961)
3. Hiramoto, *Plastics,* 18 [11] 45 (1968)
4. E. Windermuth, *Kunstoffe* 57 337 (1967)
5. Sato, *Plastics Age,* 1966 [3] 47
6. *Rubber Digest,* 18 [1] 42 (1966)
7. T. T. Stetz, *Rubber Age,* 1965 [5] 74
8. K. Ellegast, *Kunstoffe,* 55 306 (1965)
9. K. A. Pigott, *Modern Plastics,* 40 Dec., 117 (1962)
10. I.E.C. *Prod. Res. Develop.,* 1 28 (1962)
11. *Rubber Digest* 14 [5] 40 (1962)
12. C. S. Schollenberger *Rubber World* 142 81 (161), 137 549 (1958)

The compositions of the present invention can additionally contain polyisocyanates. When polyisocyanates are incorporated into the compositions as mentioned above, the heat resistance of the resulting adhesive compositions is further augmented. The polyisocyanates added are those having two or more functional groups and include, for example, those polyisocyanates previously described above with respect to the urethane elastomers, e.g., di-isocyanates such as m-phenylene-di-isocyanate, p-phenylene-di-isocyanate, 2,6-tolylene-di-isocyanate, 2,4-tolylene-di-isocyanate, naphthalene-1,4-di-isocyanate, diphenylmethane 4,4′-di-isocyanate, trimethylene-di-isocyanate, hexamethylene-di-isocyanate, etc.; tri-isocyanates such as 4,4', 4"-triphenylmethane-tri-isocyanate, toluene-2,4,6-tri-isocyanate, etc.; and tetra-isocyanates such as 4,4'-dimethyldiphenylmethane2,2'5,5'-tetra-isocyanate, etc.

The polyisocyanates can be added to the present compositions in an amount of about 0.1 to 10% by weight, preferably 1 to 5% by weight, of the compositions.

As described above, the heat resistance of the present adhesive compositions is improved by the addition thereto of polyisocyanates. The reason therefore is considered to be that a reaction between some isocyanate groups retained in the urethane elastomers and the carboxyl groups in the ether-type polyesters first occurs and then the crosslinking proceeds therein by the addition of the polyisocyanates.

The present compositions can be prepared by dissolving the above described two or three components. For example, the ether-type polyesters and the urethane elastomers can be kneaded together and then dissolved in a solvent, optionally after being pulverized, and, if desired, a solution of polyisocyanates can be added to this mixture. This is one preferred embodiment for preparing the present compositions.

The solvents used can be conventional organic solvents, for example, chlorine containing solvents (such as methylene chloride), ketones (such as methyl ethyl ketone), esters, etc. However, solvents having active hydrogen(s) such as alcohols, amines, etc. are inappropriate, since the polyisocyanates lose their reactivity in such solvents.

The ether-type polyesters, the urethane elastomers, the polyisocyanates and the solvents as described above can be used alone or in the form of a mixture of the respective substances during preparation.

The inventors have noted the fact that such an ether-type polyester urethane adhesive shows excellent adhesiveness and in particular to a metal or other substances.

That is, it has been additionally found that a composition, prepared by adding a polyisocyanate and a pigment to the above-described ether-type polyester, enables coating without surface-processing of a substance to be coated or with only an extremely simple processing such as a surface-wiping with trichlene or the like because of the synergistic effects of the components. The composition possesses a high film strength, heat resitance, elasticity and abrasion resistance, which are necessary properties for a coating material.

In this embodiment of the invention, the ether-type polyester includes those described previously arising from the glycol interchange and in particular, those prepared by interchanging about 30 to 100% of ethylene glycol contained in polyethylene terephthalate with polyethylene glycol are desirable.

The ether-type polyesters are mixed with a polyisocyanate(s) as described previously and with a pigment. The polyisocyanates function to cross-link the ether-type polyester and, at the same time, they themselves are polymerized. Therefore, the polyisocyanates can increase the adhesivity due to an increase in intermolecular cohesive forces and, in addition, can increase the strength of the coating film, heat resistance, elasticity and abrasion resistance.

The amount of the polyisocyanate which can be added is not particularly limited but, from the standpoint of economics, 0.1 to 5 parts by weight, particularly 1 to 3 parts by weight, based on 100 parts by weight of the polyester is preferred.

As the coloring ingredient for the coating composition, all kinds of pigments employed in conventional coating materials (such as red lead, red iron oxide, titanium white, talc, quinacridone pigments, phthalocyanine V etc.) can be used. Since such pigments do not affect the composition of the present invention, the amount thereof to be added is not particularly limited. The amount of the pigment can range from about 0.1 to 500 wt%, preferably 0.1 to 60 wt% to the ether-type polyester or polymer reaction product of polyester and isocyanate.

The above-described ether-type polyester and isocyanate are soluble in a solvent such as trichloroethylene, dichloroethylene, methylene chloride, tetrahydrofuran, acetone, methyl ethyl ketone, etc. Therefore, the coating material of the present invention can be prepared by dissolving the ether-type polyester and a polyisocyanate in a suitable solvent and dispersing a pigment therein. It is also possible to dissolve the ether-type polyester in a solvent, disperse a pigment therein and, immediately before use, add the polyisocyanate thereto. The coating composition of the present invention is characterized by its component composition. Therefore, the method of the preparation thereof and the kinds of additional additives are in no way limited. For example, those additives which are conventionally employed in the art, such as a supplementary solvent (e.g., toluene, xylene, etc.), a desiccating agent, a hardener, a plasticizer, a dispersing agent, an emulsifying agent, and the like can be incorporated into the composition upon preparation.

The present invention will now be illustrated in greater detail by reference to the following examples. Unless otherwise indicated all parts, percents and ratios, etc., are by weight.

EXAMPLE 1

A sheet obtained by kneading 100 parts of a linear thermoplastic urethane elastomer (molecular weight: 2000) and 10 parts of an ether-type polyester on a roll at room temperature was finely pulverized, put into solvent mixture consisting of 20 parts of methylene chloride and 150 parts of methylethyl ketone, swollen therein and stirred to completely dissolve the same. The thus obtained composition was applied to materials to be adhered and dried at a temperature of 50°-60° C for 30-50 minutes. The coated surfaces were faced towards each other, subjected to pressure adhesion and left as such for 24 hours. A release test was performed using the sample, the results obtained being as follows:

| Substances Tested | Adhesion Strength |
| --- | --- |
| | (lbs/inch) |
| Ethylene-Vinyl Acetate Copolymer | 17.4 |
| Nylon Fabric | 24.4 |
| Soft Polyvinyl Chloride | 35.0 |

For comparison, a release test was also performed on a composition not including the ether-type polyester. The results obtained were as follows:

| Substances Tested | Adhesion Strength |
| --- | --- |
| | (lbs/inch) |
| Ethylene-Vinyl Acetate Copolymer | 13.6 |
| Nylon Fabric | 15.2 |
| Soft Polyvinyl Chloride | 30.0 |

As shown in the above, the adhesive compositions of the present invention are useful with various materials.

EXAMPLE 2

100 parts of a linear thermoplastic urethane elastomer (molecular weight: 2000) and 30 parts of an ether-type polyester were mixed, melted and cooled, and then, after being pulverized into a fine powder, were dissolved in 70 parts of methylene chloride and 210 parts of methyl ethyl ketone. To this solution a solution of 2 parts of tri-phenylmethane-tri-isocyanate dissolved in 10 parts of methylene chloride was added.

The thus prepared composition was immediately applied to cotton fabric. Separately, a reference composition not including any isocyanate was also applied to the same kind of cotton fabric. The coated fabrics were dried for 30–50 minutes at 20° C, 60° C and 100° C, respectively, and thereafter subjected to pressure adhesion and left as such for 24 hours. A release test was performed as in Example 1. The results were as follows:

| Adhesive Compositions | Adhesion Strength (lbs/inch) | | |
|---|---|---|---|
| | 20° C | 60° C | 100° C |
| Without Isocyanate | >35.0 | 3.2 | 0.6 |
| (reference) With Isocyanate (present invention) | >35.0 | 21.1 | 10.5 |

EXAMPLE 3

1. Starting materials:
Urethane elastomer: Spandex-5025 or Desmocoll-400
Isocyanate: Desmodur R
Solvent: Methylene chloride, Methyl ethyl ketone.
2. Substrate: polyethylene-vinyl acetate copolymer foamed sheet
Polyethylene-vinyl acetate copolymer sheet
Nylon-cloth
Plasticized polyvinyl chloride sheet.
3. Adhesion: Both surfaces of each substrate were coated with an adhesive, which was prepared by mixing the starting materials, using a brush. The assembly was dried for one hour at room temperature, heated at 50° C for 5 min using infrared irradiation, with the contacting surfaces adhering being pressed by a hand roll and allowed to stand for 24 hours.
4. Test method:
Dimension of specimen: Width: 25mm, Length of adhesion surface: 150 mm, Thickness: 2mm.
Procedure: Peeling at 80° C at a rate of 55mm/min.
5. Test result:

| Adhesive (mixing ratio, part) | "Modified Polyester" | 0 | 9 | 23 | 33 |
|---|---|---|---|---|---|
| | Urethane Elastomer | 100 | 91 | 77 | 67 |
| | Desmodur R | 5 | 5 | 5 | 5 |
| | Methylene Chloride | 0 | 18 | 54 | 73 |
| | Methyl Ethyl Ketone | 200 | 163 | 161 | 153 |
| Peeling Strength of Substrate (kg/25mm) | EVA Foam | 5.2 | 6.7 | 8.5 | 9 |
| | EVA Solid | 5.2 | — | 9 | 9 |
| | Nylon-Cloth | 7.8 | 9 | 6.8 | 5.0 |
| | Soft Polyvinyl Chloride | 9 | 9 | 9 | 9 |

EXAMPLE 4

Mixture of Modified Polyester and Desmodur R

Desmodur R is a strong adhesive and the adhesion can be improved by mixing it with a modified polyester with economic advantages.
Solvent: Methylene chloride
Substrate: EVA solid sheet (without surface treatment)
Coating: Single surface coating
Test method: Tension shearing at 200mm/min
Test result:

| Mixing Ratio (part) | Modified Polyester | 100 | 100 | 100 | 100 | 100 | 100 | 100 |
|---|---|---|---|---|---|---|---|---|
| | Desmodur R | 0 | 1 | 2 | 3 | 5 | 8 | 10 |
| Shearing Strength (kg/25mm$^2$) | 24 hour | 3.2 | 5.5 | 7.3 | 4.4 | 3.3 | 4.3 | 4.5 |
| | 48 hour | — | 6.6 | 7.6 | 4.6 | 5.2 | 5.0 | — |

EXAMPLE 5

Mixture of Modified Polyester and Urethane Elastomer (Desmocoll 4000)

Urethane elastomers are used as an adhesive for shoes and the adhesion thereof can be improved strongly by mixing them with a modified polyester.
Solvent: Methylene chloride
Substrate: EVA solid sheet (without surface treatment)
Coating: Single surface coating; Both surface coating
Test method: Tension shearing at 200mm/min
Test result:

| Mixing Ratio (part) | Modified Polyester | 0 | 10 | 20 | 30 | 40 | 50 | 60 | 70 | 80 | 90 | 100 |
|---|---|---|---|---|---|---|---|---|---|---|---|---|
| | Desmocoll 400 | 100 | 90 | 80 | 70 | 60 | 50 | 40 | 30 | 20 | 10 | 0 |
| Shearing Strength (kg/25mm$^2$) | Single Surface Coating, 24 hr | 2.7 | 2.1 | 2.5 | 3.1 | 3.6 | 4.0 | 6.3 | 7.3 | 9.2 | 9.7 | 6.0 |
| | Single Surface Coating, 48 hr | — | 2.8 | 3.9 | 3.2 | 3.5 | 5.9 | 6.3 | 8.0 | 11.9 | 10.6 | — |
| | Both Surface Coating, 24 hr | | | | | | | 10.1 | 12.6 | 12.9 | 13.2 | |

EXAMPLE 6

Adhesion Strength of Modified Polyester or Urethane Elastomer Alone

Solvent: Methylene chloride; Methyl ethyl ketone
Coating: Both surface coating
Test Method: Tension shearing at 200mm/min, peeling at 180° C at a rate of 55mm/min.
Shear Strength (kg/25mm$^2$):

| Adhesive | Hard Polyvinyl Chloride | Soft Poly-Vinyl Chloride | Poly-ethylene | Poly-propylene | Poly-ethylene propylene diene copolymer | SBR |
|---|---|---|---|---|---|---|
| Modified Polyester | 15.2 | 18.3* | 6.2 | 2.1 | 4.5 | 33* |
| Desmocoll 400 | 10.7 | 17.3* | 2.1 | 3.1 | 3.5 | 324* |

*broken

Peeling strength (kg/25mm):

| | | |
|---|---|---|
| Modified Polyester | 2.7 | 5.5 |
| Desmocoll 400 | 17.2* | 3.9 |

*broken

EXAMPLE 7

The weather proof adhesion strength of a modified polyester-urethane mixed adhesive is regarded as sufficient in practice and is improved further by adding a carbodiimide.

Substrate: Soft polyvinyl chloride sheet
Test Method: T-peeling test; tension rate: 200mm/min.

| | | | | | |
|---|---|---|---|---|---|
| Mixing ratio (part) | Modified Polyester | 100 | 100 | 100 | 100 |
| | Urethane Elastomer | 25 | 25 | 25 | 25 |
| | Methylene Chloride | 500 | 500 | 500 | 500 |
| | Carbodiimide | | 1.25 | 2.5 | 3.75 |
| Peeling Strength (kg/25mm) | 2 hrs | 1.7 | 1.9 | 2.1 | 2.4 |
| | 24 hrs | 3.4 | 3.7 | 7.7 | 4.8 |
| | 72 hrs | 3.9 | 4.3 | 7.5 | 5.0 |
| | 24 hrs (*weatherometer, 60 hrs) | 3.4 | 5.7 | 5.6 | 6.0 |
| | 72 hrs (weatherometer, 60 hrs) | 2.1 | 4.5 | 5.2 | 6.2 |

*Weatherometer:
Thermo-and melt-tester, commercially available from, for example, Tabai and Shibata.

EXAMPLE 8

| | Parts |
|---|---|
| Ether-type Polyester | 100 |
| Linear Chain-Type Urethane Elastomer (Pandex) | 50 |
| Red Lead | 100 |
| Red Iron Oxide | 30 |
| Talc | 30 |
| Methyl Ethyl Ketone | 90 |
| Toluene | 10 |

The above-described ingredients were compounded and, immediately before use, 50 parts by weight of a 20% methylene chloride solution of triphenylmethane-triisocyanate was added thereto and the resulting composition was applied to an iron plate. The properties of the coating film obtained were as follows:

| | |
|---|---|
| Hardness (Sward) | 43 |
| Tensile Strength of Coating Film | 350 kg/cm$^2$ |
| Abrasion Resistance (Weight Loss by Taper CS-17) | 16 |

EXAMPLE 9

| | Parts |
|---|---|
| Ether-type Polyester | 100 |
| Crude MID | 10 |
| Titanium White | 40 |
| Methyl Ethyl Ketone | 70 |

-continued

| | Parts |
|---|---|
| Xylene | 50 |

To the above-described composition was added 8 parts of Desmodur RF and the resulting composition was coated. The properties of the resulting coating film were as follows.

| | |
|---|---|
| Hardness (Sward) | 45 |
| Tensile Strength of Coating Film | 330 kg/cm$^2$ |
| Abrasion Resistance (Weight Loss by Taper CS-17) | 16 |

While the invention has been described in detail and with reference to specific embodiments thereof, it will be apparent to one skilled in the art that various changes and modifications can be made therein without departing from the spirit and scope thereof.

What is claimed is:

1. An adhesive composition consisting essentially of an ether group containing polyester obtained by the heat treatment of a polyethylene terephthalate with at least one glycol having at least 3 carbon atoms to substitute the ethylene glycol components in the polyethylene terephthalate by said glycol having at least 3 carbon atoms, wherein 30 to 100% of the ethylene glycol components in the polyethylene terephthalate are substituted by said glycol having 3 or more carbon atoms a linear thermoplastic high molecular weight urethane elastomer; and a polyisocyanate which differs from said elastomer.

2. The adhesive composition as claimed in claim 1, wherein said polyisocyanate is a di-isocyanate selected from the group consisting of m-phenylene-di-isocyanate, p-phenylene-di-isocyanate, 2,6-tolylene-di-isocyanate, 2,4-tolylene-di-isocyanate, naphthalene-1,4-di-isocyanate, diphenylmethane-4,4'di-isocyanate, trimethylene-di-isocyanate and hexamethylene-di-isocyanate; a triisocyanate selected from the group consisting of 4,4',4"triphenylmethane-tri-isocyanate and toluene-2,4,6-tri-isocyanate; or a tetra-isocyanate which is 4,4'-dimethyldiphenyl-methane-2,2',5,5'-tetra-isocyanate.

3. The adhesive composition as claimed in claim 1, wherein said polyisocyanate is present in an amount of 0.1 to 10% by weight based on the total weight of said composition.

4. The adhesive composition of claim 1 wherein said polyester amounts to 10–40% by weight of said urethane elastomer.

5. The adhesive composition of claim 4, wherein said glycol is selected from the group consisting of

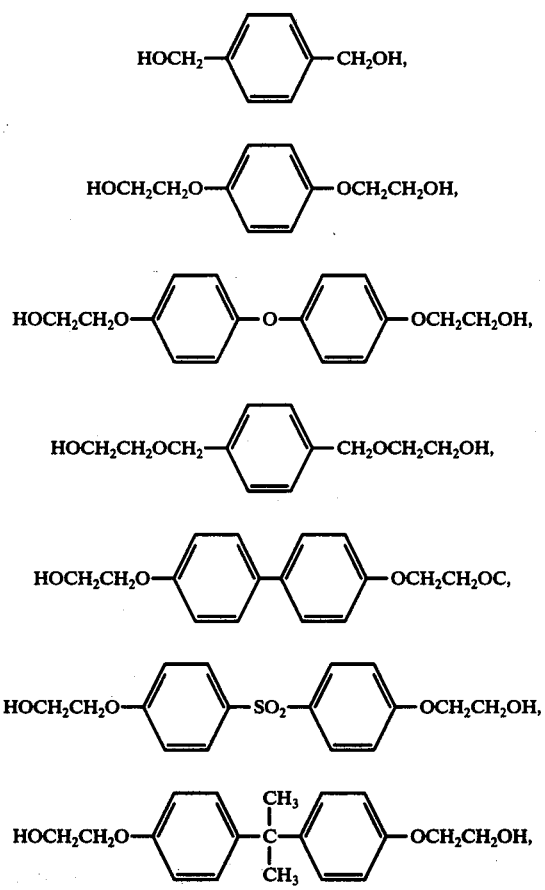

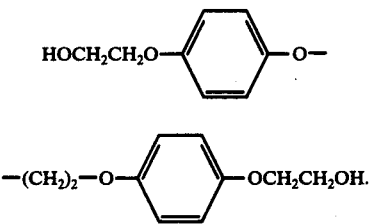

and

−(CH$_2$)$_2$−O−⟨benzene⟩−OCH$_2$CH$_2$OH.

6. The adhesive composition of claim 4, wherein said glycol has the formula HO(CH$_2$CH$_2$)$_n$OH wherein $n$ represents an integer of from 2 to 100.

7. The adhesive composition of claim 1 wherein said urethane elastomer has a molecular weight of from 500 to 5,000.

8. The adhesive composition of claim 4 wherein said polyisocyanate comprises from 1 to 5% by weight of the adhesive composition and further wherein the amount of the polyisocyanate is from 1 to 3 parts by weight, based on 100 parts by weight of said polyester.

9. The adhesive composition as claimed in claim 1 further including a solvent which is free of active hydrogens.

10. The adhesive composition as claimed in claim 1 wherein said urethane elastomer is obtained by the addition reaction of a polyisocyanate and a polyol, a polyamine or an amino alcohol, and has a molecular weight of about 200 to 20,000, and further wherein said polyisocyanate has 2 or more functional groups, and is selected from the group consisting of a diisocyanate, a triisocyanate and tetraisocyanate.

* * * * *